(12) United States Patent
Wang et al.

(10) Patent No.: US 12,147,099 B2
(45) Date of Patent: Nov. 19, 2024

(54) ELECTRONIC DEVICE COMPRISING A VIEWING ANGLE CONTROL STRUCTURE HAVING A PHASE ADJUSTMENT STRUCTURE BETWEEN A SECOND ALIGNMENT LAYER AND A SECOND SUBSTRATE

(71) Applicant: Innolux Corporation, Miaoli County (TW)

(72) Inventors: Jo-Hsin Wang, Miaoli County (TW); Jyun-Sian Li, Miaoli County (TW); Hao-Yu Chen, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 1 day.

(21) Appl. No.: 17/953,339

(22) Filed: Sep. 27, 2022

(65) Prior Publication Data

US 2023/0132098 A1 Apr. 27, 2023

(30) Foreign Application Priority Data

Oct. 25, 2021 (CN) .......................... 202111241743.4

(51) Int. Cl.
*G02F 1/13* (2006.01)
*G02F 1/1335* (2006.01)
(Continued)

(52) U.S. Cl.
CPC ...... *G02F 1/1323* (2013.01); *G02F 1/133531* (2021.01); *G02F 1/13363* (2013.01); *G02F 1/133738* (2021.01); *G02F 1/133742* (2021.01)

(58) Field of Classification Search
CPC ................................................ G02F 1/133738
See application file for complete search history.

(56) References Cited

U.S. PATENT DOCUMENTS

| 2018/0329245 A1* | 11/2018 | Robinson | .......... G02F 1/134309 |
| 2019/0353944 A1* | 11/2019 | Acreman | .......... G02F 1/134309 |
| 2020/0192018 A1* | 6/2020 | Pan | .................... G02F 1/133528 |

FOREIGN PATENT DOCUMENTS

| CN | 103792721 A | * | 5/2014 | ....... G02F 1/133528 |
| CN | 110501823 | | 11/2019 | |

(Continued)

OTHER PUBLICATIONS

"Office Action of Taiwan Counterpart Application", issued on Feb. 24, 2023, p. 1-p. 7.

(Continued)

*Primary Examiner* — Paul C Lee
(74) *Attorney, Agent, or Firm* — JCIPRNET (57) ABSTRACT

The disclosure provides an electronic device including a viewing angle control structure. The viewing angle control structure includes a first substrate, a second substrate disposed opposite to the first substrate, an adjustable dielectric layer disposed between the first substrate and the second substrate, a first alignment layer disposed between the first substrate and the adjustable dielectric layer, and a second alignment layer disposed between the second substrate and the adjustable dielectric layer. One of the first alignment layer and the second alignment layer is in a horizontal alignment and the other of the first alignment layer and the second alignment layer is in a vertical alignment.

18 Claims, 8 Drawing Sheets

(51) Int. Cl.
   *G02F 1/13363*   (2006.01)
   *G02F 1/1337*   (2006.01)

(56) References Cited

FOREIGN PATENT DOCUMENTS

| | | | | | |
|---|---|---|---|---|---|
| CN | 110501823 | A | * | 11/2019 | ........... G02F 1/1323 |
| CN | 112305804 | | | 2/2021 | |
| JP | 2008299280 | A | * | 12/2008 | |
| TW | I718641 | | | 2/2021 | |
| TW | 202109158 | | | 3/2021 | |

OTHER PUBLICATIONS

"Office Action of Taiwan Counterpart Application", issued on Mar. 20, 2024, p. 1-p. 4.

* cited by examiner

ELECTRONIC DEVICE COMPRISING A VIEWING ANGLE CONTROL STRUCTURE HAVING A PHASE ADJUSTMENT STRUCTURE BETWEEN A SECOND ALIGNMENT LAYER AND A SECOND SUBSTRATE

CROSS-REFERENCE TO RELATED APPLICATION

This application claims the priority benefit of China application serial no. 202111241743.4, filed on Oct. 25, 2021. The entirety of the above-mentioned patent application is hereby incorporated by reference herein and made a part of this specification.

BACKGROUND

Technical Field

The disclosure relates to an electronic device.

Description of Related Art

The application fields of electronic devices are becoming more and more widespread. In some usage scenarios, electronic devices need to include privacy protection, and therefore electronic devices having privacy protection function still have room for improvement.

SUMMARY

According to an embodiment of the disclosure, an electronic device includes a viewing angle control structure. The viewing angle control structure includes a first substrate, a second substrate disposed opposite to the first substrate, an adjustable dielectric layer disposed between the first substrate and the second substrate, a first alignment layer disposed between the first substrate and the adjustable dielectric layer, and a second alignment layer disposed between the second substrate and the adjustable dielectric layer. One of the first alignment layer and the second alignment layer is in a horizontal alignment and the other of the first alignment layer and the second alignment layer is in a vertical alignment.

According to an embodiment of the disclosure, an electronic device includes a viewing angle control structure. The viewing angle control structure includes a first polarizer; a second polarizer disposed opposite to the first polarizer; an adjustable dielectric layer disposed between the first polarizer and the second polarizer; and a phase adjustment structure disposed between the first polarizer and the second polarizer. A phase retardation value $\Delta nd$ of the adjustable dielectric layer is A nm, an overall thickness direction retardation value Rth of the phase adjustment structure is B nm, and A and B conform to the following relationship: $A*0.600-360 \leq B \leq A*0.8667+220$.

In order to make the above features and advantages of the disclosure better understood, embodiments are specifically provided below with reference to figures for detailed description as follows.

BRIEF DESCRIPTION OF THE DRAWINGS

The accompanying drawings are included to further understand the disclosure, and the drawings are incorporated in the specification and constitute a part of the specification. The drawings illustrate embodiments of the disclosure and, together with the description, serve to explain principles of the disclosure.

DESCRIPTION OF THE EMBODIMENTS

The disclosure may be understood by referring to the following detailed description in conjunction with the accompanying drawings. It should be noted that in order to facilitate understanding to the reader and to simplify the drawings, the multiple drawings in the disclosure depict a part of the electronic device, and certain elements in the drawings are not drawn to actual scale. In addition, the number and size of each element in the figures are for illustration, and are not intended to limit the scope of the disclosure.

Certain terms are used throughout the specification and the appended claims of the disclosure to refer to particular elements. Those skilled in the art should understand that electronic equipment manufacturers may refer to the same elements under different names. This article is not intended to distinguish between elements having the same function but different names.

In the following description and claims, the words "including" and "containing" and the like are open terms, so they should be interpreted as meaning "including but not limited to . . . "

It should be understood that when an element or film layer is referred to as "disposed" "on" or "connected to" to another element or film layer, the element or film layer may be directly on the other element or film layer or directly connected to the other element or film layer, or there is an inserted element or film layer between the two (indirect case). Conversely, when an element is referred to as "directly" on or "directly connected" to another element or film layer, there is no intervening element or film layer between the two. When an element or film layer is referred to as being "electrically connected" to another element or film layer, it may be read as either a direct electrical connection or an indirect electrical connection.

The terms "about", "equal to", "equal" or "identical", "substantially" or "roughly" are generally interpreted as being within plus or minus 20% range of a given value, or interpreted as within plus or minus 10%, plus or minus 5%, plus or minus 3%, plus or minus 2%, plus or minus 1%, or plus or minus 0.5% range of the given value.

Although the terms "first", "second", "third" . . . may be used to describe various constituent elements, the constituent elements are not limited to these terms. These terms are used to distinguish a single constituent element from other constituent elements in the specification. The same terms may not be used in the claims, and the elements in the claims may be replaced with first, second, third . . . according to the order declared by the elements in the claims. Therefore, in the following description, the first constituent element may be the second constituent element in the claims.

The electrical connection or coupling described in the disclosure may refer to direct connection or indirect connection. In the case of direct connection, the endpoints of the members on two circuits are directly connected or connected to each other by a conductive line segment. In the case of indirect connection, there are switches, diodes, capacitors, inductors, resistors, other suitable members, or a combination of the members between the endpoints of the members on the two circuits, but the disclosure is not limited thereto.

In the present disclosure, the thickness, length, and width may be measured using an optical microscope, and the width or thickness may be measured from a cross-sectional image in an electron microscope, but the disclosure is not limited thereto. In addition, there may be a certain error in any two values or directions for comparison. In addition, the terms "equivalent", "equal", "same", "substantially", or "essentially" mentioned in the disclosure usually represent within 10% of a given value or range. In addition, the phrases "the given range is from a first numerical value to a second numerical value" and "the given range falls within the range of a first numerical value to a second numerical value" mean that the given range contains the first numerical value, the second numerical value, and other values in between. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

Unless otherwise defined, all terms (including technical and scientific terms) used herein have the same meaning as commonly understood by those skilled in the art to which the disclosure belongs. It should be understood that, these terms, such as those defined in commonly used dictionaries, should be interpreted as having meaning consistent with the relevant technique and the background or context of the disclosure, and should not be interpreted in an idealized or excessively formal way, unless specifically defined in an embodiment of the disclosure.

In the disclosure, an electronic device may include a display device, a sensing device, or a tiling device, but the disclosure is not limited thereto. The electronic device may be a bendable or flexible electronic device. The display device may be a non-self-luminous type display device or a self-luminous type display device. The sensing device may be a sensing device for sensing capacitance, light, heat, or ultrasonic waves, but the disclosure is not limited thereto. In the disclosure, the electronic element may include a passive element and an active element, such as a capacitor, a resistor, an inductor, a diode, a transistor, and so on. The diode may include a light-emitting diode or a photodiode. The light-emitting diode may include, for example, an organic light-emitting diode (OLED), a mini LED, a micro LED, or a quantum dot LED, but the disclosure is not limited thereto. In the disclosure, the display panel may include a self-luminous or non-self-luminous panel. The self-luminous panel may include, for example, an organic light-emitting diode (OLED), a mini LED, a micro LED, or a quantum dot (QD) LED, but the disclosure is not limited thereto. The non-self-luminous panel includes, for example, liquid crystal or other suitable materials. It should be noted that the electronic device may be any combination of the above, but the disclosure is not limited thereto. The following uses a display device as an electronic device or a tiling device to explain the content of the disclosure, but the disclosure is not limited thereto.

It should be noted that the technical solutions provided by the different embodiments below may be used interchangeably, combined, or mixed to form another embodiment without violating the spirit of the disclosure.

An electronic device of the disclosure may provide a screen display function, and may specifically provide different display modes. For example, in one display mode, the electronic device of the disclosure may display images in a wider viewing angle range, and in another display mode, the electronic device of the disclosure may display images in a narrower viewing angle range. In this way, the electronic device may provide a privacy protection function or switch the display mode according to different usage requirements.

Figure 1:
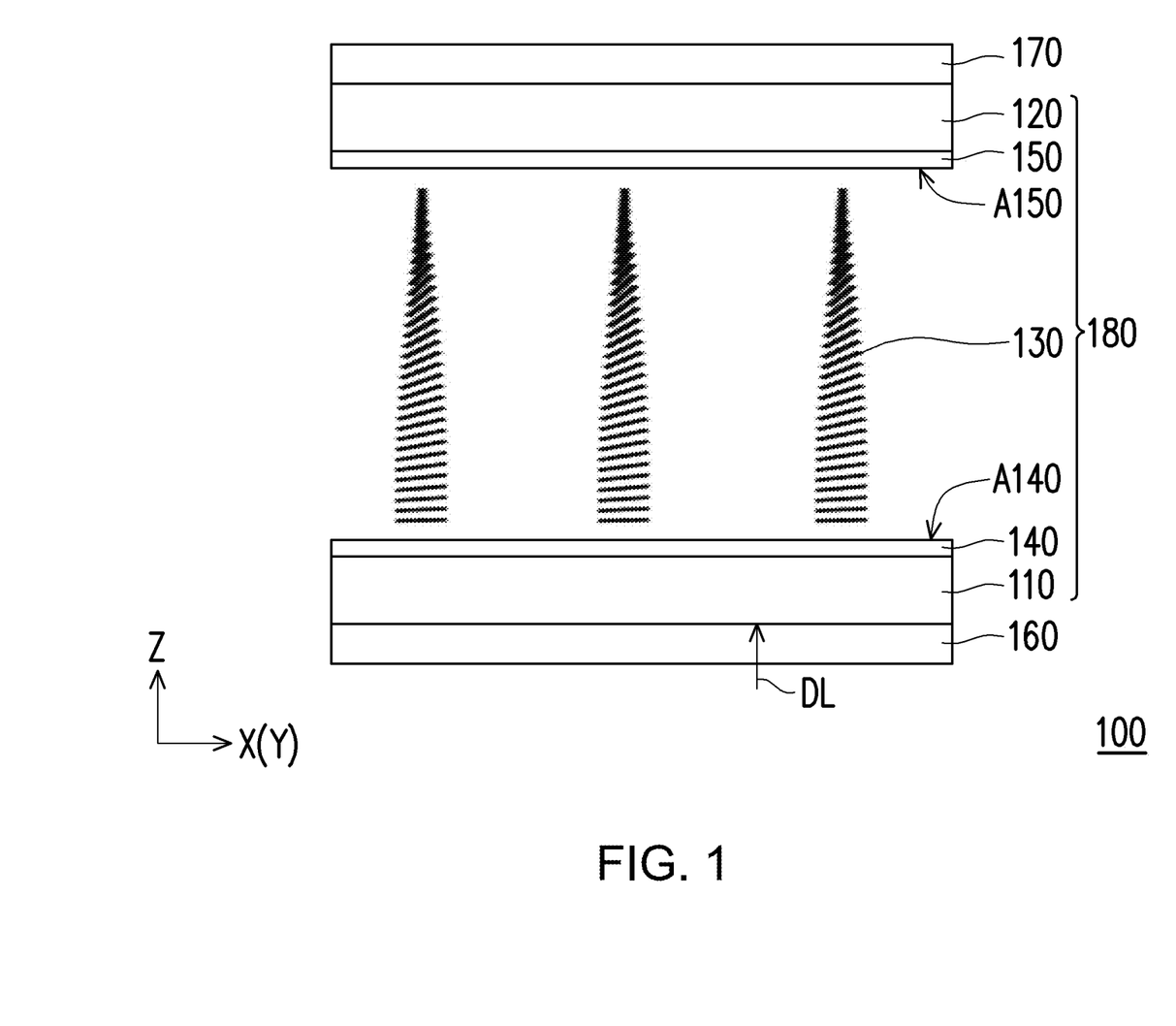
FIG. 1 is a partial schematic diagram of a viewing angle control structure in an electronic device of an embodiment of the disclosure.

FIG. 1 is a partial schematic diagram of a viewing angle control structure in an electronic device of an embodiment of the disclosure. A viewing angle control structure 100 is a member disposed in the electronic device to control the display viewing angle of the electronic device. The viewing angle control structure 100 may include a first substrate 110, a second substrate 120, an adjustable dielectric layer 130, a first alignment layer 140, a second alignment layer 150, a first polarizer 160, and a second polarizer 170, but the disclosure is not limited thereto. The second substrate 120 may be disposed opposite to the first substrate 110. The adjustable dielectric layer 130 is disposed between the first substrate 110 and the second substrate 120. In some embodiments, the first alignment layer 140 may be disposed between the first substrate 110 and the adjustable dielectric layer 130, and the second alignment layer 150 may be disposed between the second substrate 120 and the adjustable dielectric layer 130. In some embodiments, the adjustable dielectric layer 130 may be disposed between the first alignment layer 140 and the second alignment layer 150. In some embodiments, the first polarizer 160 may be disposed on a side of the first substrate 110 away from the adjustable dielectric layer 130, and the second polarizer 170 may be disposed on a side of the second substrate 120 away from the adjustable dielectric layer 130.

In some embodiments, the first substrate 110 and/or the second substrate 120 may include a transparent substrate. In some embodiments, the first substrate 110 and/or the second substrate 120 may include a rigid substrate or a flexible substrate. In some embodiments, the material of the first substrate 110 and/or the second substrate 120 includes a single-layer structure of one of glass, quartz, polyimide (PI), polyethylene terephthalate (PET), polycarbonate, or other suitable materials, or a laminate or mixture of at least two of the above materials, but the disclosure is not limited thereto. In some embodiments, at least one of the first substrate 110 and/or the second substrate 120 may have a thickness direction retardation value (Rth). For example, the material of at least one of the first substrate 110 and the second substrate 120 may include PI, PET, polycarbonate, other similar materials, or a combination thereof, and at this time, at least one of the first substrate 110 and the second substrate 120 may have a thickness direction retardation value (Rth).

In some embodiments, the material of the adjustable dielectric layer 130 includes liquid crystal, other materials having light modulation properties, or a combination thereof. For example, the adjustable dielectric material 130 may have birefringence properties. When the adjustable dielectric material 130 is driven under different electric fields, the material molecules in the adjustable dielectric material 130 may change the arrangement direction according to the different electric fields. Thereby, the polarization state of the incident light is modulated. In some embodiments, although not shown in FIG. 1, at least one of the first substrate 110 and the second substrate 120 may be provided with driving electrodes and/or driving circuits.

In some embodiments, the first alignment layer 140 and the second alignment layer 150 may be located at two opposite sides of the adjustable dielectric layer 130, respectively, and the first alignment layer 140 and the second alignment layer 150 may make the adjustable dielectric layer 130 have a pretilt angle on both sides respectively. In some embodiments, one of the first alignment layer 140 and the second alignment layer 150 may be in a horizontal alignment and the other of the first alignment layer 140 and the second alignment layer 150 may be in a vertical alignment, but the disclosure is not limited thereto. In some embodiments, the first alignment layer 140 has a first alignment direction A140, and the second alignment layer 150 has a second alignment direction A150. In some embodiments, when the first alignment layer 140 is horizontally aligned, the first alignment direction A140 may be substantially parallel to the surface of the first substrate 110 (e.g., the plane defined by the X-axis and the Y-axis). In some embodiments, when the second alignment layer 150 is vertically aligned, the second alignment direction A150 may be substantially parallel to the normal direction (e.g., the Z-axis) of the second substrate 120. In other embodiments, the first alignment layer 140 may be vertically aligned, and the second alignment layer 150 may be horizontally aligned, but the disclosure is not limited thereto. In other embodiments, both the first alignment layer 140 and the second alignment layer 150 may be horizontally aligned, but the disclosure is not limited thereto.

It should be mentioned that, the material of the adjustable dielectric layer 130 may provide the material adjacent to the alignment layer adjustable dielectric layer 130 with an alignment tilt angle (pretilt angle) according to the alignment status of the alignment layer, and this alignment tilt angle (pretilt angle) is, for example, an angle formed with the surface of an adjacent substrate. When the alignment layer is horizontally aligned, the alignment tilt angle (pretilt angle) is, for example, between 0 degrees and 30 degrees (0 degrees≤included angle≤30 degrees), such as between 0 degrees and 15 degrees (0 degrees≤included angle≤15 degrees) or between 0 degrees and 10 degrees (0 degrees≤included angle≤10 degrees), but the disclosure is not limited thereto. When the alignment layer is vertically aligned, the alignment tilt angle (pretilt angle) is, for example, between 50 degrees and 90 degrees (50 degrees≤included angle≤90 degrees), such as between 60 degrees and 90 degrees (60 degrees≤included angle≤90 degrees) or between 70 degrees and 90 degrees (70 degrees≤included angle≤90 degrees), but the disclosure is not limited thereto. In some embodiments, the first alignment layer 140 and the second alignment layer 150 may have different materials, or may have the same material but be in a composite alignment, and the composite alignment means that one of the first alignment layer 140 and the second alignment layer 150 may be horizontally aligned and the other may be vertically aligned.

In some embodiments, the first substrate 110, the second substrate 120, the adjustable dielectric layer 130, the first alignment layer 140, and the second alignment layer 150 may, for example, form a panel unit 180, but the disclosure is not limited thereto. In some embodiments, the panel unit 180 may be disposed between the first polarizer 160 and the second polarizer 170. In some embodiments, the absorption axis direction of the first polarizer 160 may be substantially parallel to the absorption axis direction of the second polarizer 170, for example, but the disclosure is not limited thereto.

Figure 7:
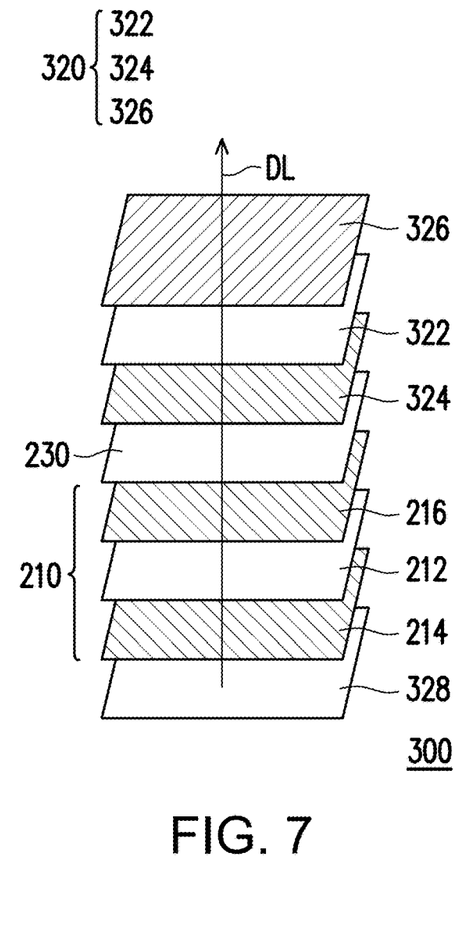
FIG. 7 is a schematic diagram of an electronic device of an embodiment of the disclosure.
Figure 8:
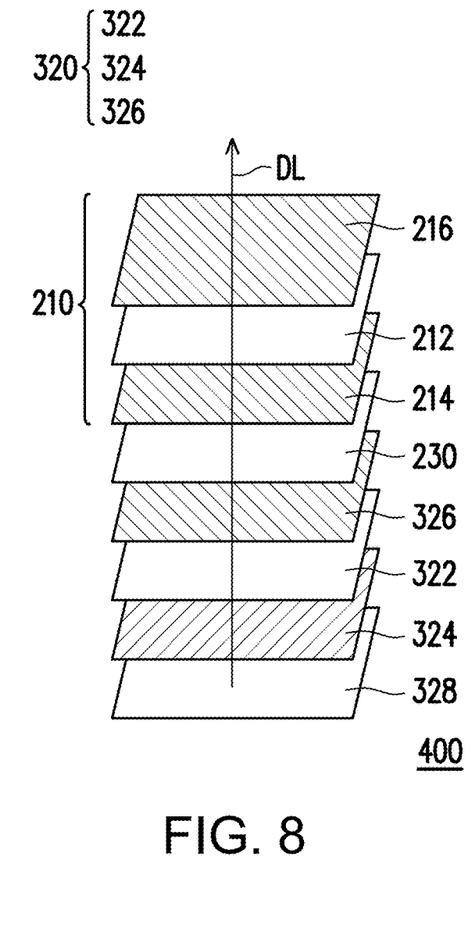
FIG. 8 is a schematic diagram of an electronic device of an embodiment of the disclosure.

In some embodiments, a light DL may be provided, and the light DL may come from, for example, a display structure (refer to the description of FIG. 7 to be followed) or a light source module (refer to the description of FIG. 8 to be followed). The light DL may have a polarization state after passing through the first polarizer 160. Then, the light DL may pass through the panel unit 180 and the second polarizer 170 in sequence. In some embodiments, by driving the panel unit 180, the light path of the passing light may be changed to adjust the transmittance after passing through the second polarizer 170, thereby adjusting the transmittance of the viewing angle control structure 100 under different viewing angles.

In some embodiments, the arrangement of the material molecules in the adjustable dielectric layer 130 may be changed according to the driven electric field, so as to control the light path of the passing light DL, thereby switching different modes such as narrow viewing angle mode or wide viewing angle mode.

In some embodiments, the viewing angle control structure 100 may include a phase adjustment structure (not shown in FIG. 1, please refer to the following table for description), and the phase adjustment structure may be disposed between the first polarizer 160 and the second polarizer 170.

For example, the following table lists the components of the viewing angle control structure of several embodiments:

| Embodiment 1 | Embodiment 2 | Embodiment 3 | Embodiment 4 |
| --- | --- | --- | --- |
| Second polarizer | Second polarizer | Second polarizer | Second polarizer |
| Phase adjustment structure | Second substrate | Phase adjustment structure (Second substrate) | Phase adjustment structure |
| Second substrate | Phase adjustment structure | | Second substrate |
| Second alignment layer | Second alignment layer | Second alignment layer | Second alignment layer |
| Adjustable dielectric layer | Adjustable dielectric layer | Adjustable dielectric layer | Adjustable dielectric layer |
| First alignment layer | First alignment layer | First alignment layer | First alignment layer |
| First substrate | First substrate | Phase adjustment structure (First substrate) | First substrate |
| | | | Phase adjustment structure |
| First polarizer | First polarizer | First polarizer | First polarizer |

In the table above, the viewing angle control structure of Embodiment 1 includes a first polarizer, a first substrate, a first alignment layer, an adjustable dielectric layer, a second alignment layer, a second substrate, a phase adjustment structure, and/or a second polarizer stacked in sequence. The viewing angle control structure of Embodiment 2 includes a first polarizer, a first substrate, a first alignment layer, an adjustable dielectric layer, a second alignment layer, a phase adjustment structure, a second substrate, and/or a second polarizer stacked in sequence. The viewing angle control structure of Embodiment 3 includes a first polarizer, a first substrate (belongs to a portion of the phase adjustment structure), a first alignment layer, an adjustable dielectric layer, a second alignment layer, a second substrate (belongs to a portion of the phase adjustment structure), and or a second polarizer sequentially stacked, wherein the first substrate 110 and/or the second substrate 120 may have a thickness direction retardation value (Rth), and therefore the first substrate 110 and/or the second substrate 120 may be a portion of the phase adjustment structure. The viewing angle control structure of Embodiment 4 includes a first polarizer, a phase adjustment structure, a first substrate, a first alignment layer, an adjustable dielectric layer, a second alignment layer, a second substrate, a phase adjustment structure, and/or a second polarizer stacked in sequence. In the members listed in the table above, the first polarizer 160, the first substrate 110, the first alignment layer 140, the adjustable dielectric layer 130, the second alignment layer 150, the second substrate 120, and the second polarizer 170 may be implemented with reference to the related descriptions of FIG. 1, and the phase adjustment structure is, for example, composed of a layer having a suitable thickness direction retardation value. In some embodiments, for example, in the viewing angle control structure of Embodiment 3, at least one of the first substrate and the second substrate may have a thickness direction retardation value, and thus may belong to a portion of the phase adjustment structure. In some embodiments, the viewing angle control structure 100 may, for example, include other film layers or elements having phase retardation properties. In this case, the first substrate 110 or the second substrate 120 may optionally have or not have a thickness direction retardation value (Rth).

It should be noted that the layer in each embodiment above is illustrative, and some layers may be removed or other layers may be inserted as needed. In some embodiments, the phase adjustment structure and the adjustable dielectric layer 130 may be matched with each other to adjust the display effect of the viewing angle control structure 100. In general, the phase adjustment structure may be used with the optical properties of the adjustable dielectric layer 130 to provide the display effect needed by the viewing angle control structure in different display modes (e.g., a narrow viewing angle mode and a wide viewing angle mode). In some embodiments, any member having a thickness direction retardation value (Rth) between the first polarizer and the second polarizer may be regarded as a portion of the phase adjustment structure. That is, the existing first substrate 110 and second substrate 120 or other additionally provided phase retardation layers or elements may all constitute the phase adjustment structure. In some embodiments, the viewing angle control structure may include a plurality of layers of members providing a thickness direction retardation value. In other words, the phase adjustment structure includes multi-layer structures, and the multi-layer structures may be stacked on each other in sequence, or other layers may be further disposed between the multi-layer structures to be separated from each other.

Figure 2:
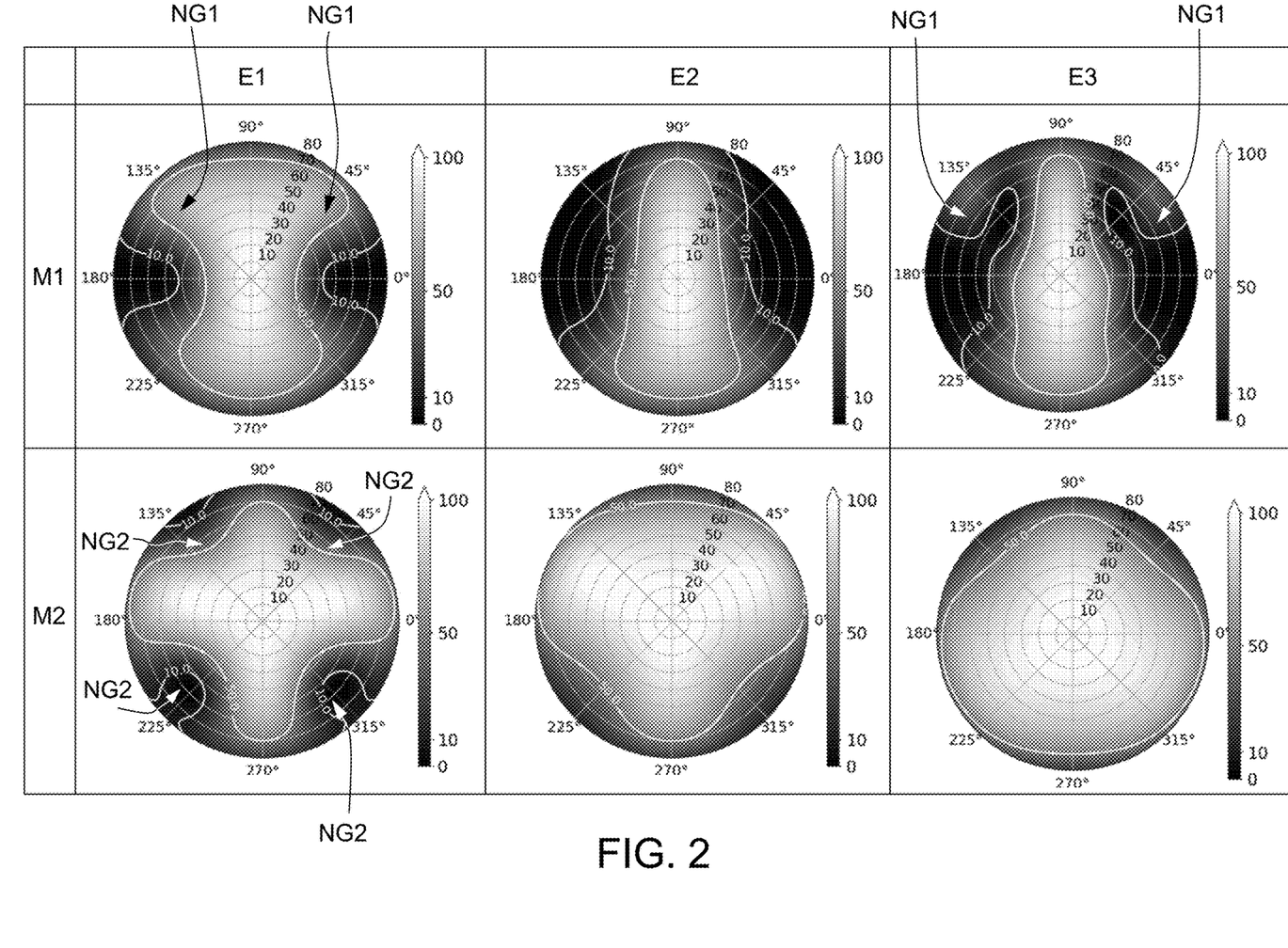
FIG. 2 is a luminance viewing angle distribution diagram obtained from an example of simulating a plurality of viewing angle control structures.

FIG. 2 is a luminance viewing angle distribution diagram obtained from an example of simulating a plurality of viewing angle control structures. The luminance viewing angle distribution diagram of FIG. 2 may be obtained from the results of measuring via a conoscopic lens, but the disclosure is not limited thereto. For example, the luminance viewing angle distribution diagram may be measured or analyzed using Conoscope, BM5A, Conometer80U, or other suitable equipment, but the disclosure is not limited thereto. It should be noted that the range or distribution of the luminance value per unit area ($cd/m^2$) of the viewing angle control structure is for illustration, but the disclosure is not limited thereto.

In FIG. 2, the luminance viewing angle distribution diagrams of Example E1, Example E2, and Example E3 of the viewing angle control structure under a narrow viewing angle mode M1 and a wide viewing angle mode M2, respectively, are presented. For example, the viewing angle control structures of Example E1, Example E2, and Example E3 all have the composite alignment described in the above embodiments and are matched with different phase adjustment structures.

In Example E1, the phase retardation value $\Delta nd$ of the adjustable dielectric layer 130 is, for example, 1800 nm (nanometers), and the overall thickness direction retardation value Rth of the phase adjustment structure is, for example, 710 nm (nanometers). In Example E2, the phase retardation value $\Delta nd$ of the adjustable dielectric layer 130 is, for example, 1800 nm (nanometers), and the overall thickness direction retardation value Rth of the phase adjustment structure is, for example, 1150 nm (nanometers). In Example E3, the phase retardation value $\Delta nd$ of the adjustable dielectric layer 130 is, for example, 1800 nm (nanometers), and the overall thickness direction retardation value Rth of the phase adjustment structure is 1800 nm (nanometers).

It may be known from FIG. 2 that, in the narrow viewing angle mode M1 of Example E1, there are a plurality of significant bright areas NG1 at the oblique viewing angle, and in the wide viewing angle mode M2, there are a plurality of significant dark areas NG2 at the oblique viewing angle. Therefore, Example E1 does not achieve the ideal switching effect between the narrow viewing angle mode M1 and the wide viewing angle mode M2. Under the narrow viewing angle mode M1 of Example E3, there are a plurality of significant bright areas NG1 at the oblique viewing angle. Therefore, Example E3 does not achieve the ideal effect of the narrow viewing angle mode M1. In Example E2, in the narrow viewing angle mode M1, there is no significant bright area NG1 at the oblique viewing angle, and in the wide viewing angle mode M2, there is also no significant dark area NG2 at the oblique viewing angle. Therefore, compared with Example E1 or Example E3, Example E2 may achieve a better switching effect between the narrow viewing angle mode M1 and the wide viewing angle mode M2. It may be known from FIG. 2 that, when the phase retardation value $\Delta nd$ of the adjustable dielectric layer 130 is fixed (e.g., 1800 nm, but not limited thereto), the overall thickness direction retardation value Rth of the phase adjustment structure may affect the effects of the narrow viewing angle mode and the wide viewing angle mode. For example, under the fixed phase retardation value $\Delta nd$ of the adjustable dielectric layer 130, an overall thickness direction retardation value Rth of the phase adjustment structure that is too large or too small may lead to an unsatisfactory switching effect of the wide viewing angle mode or the narrow viewing angle mode.

Figure 3:
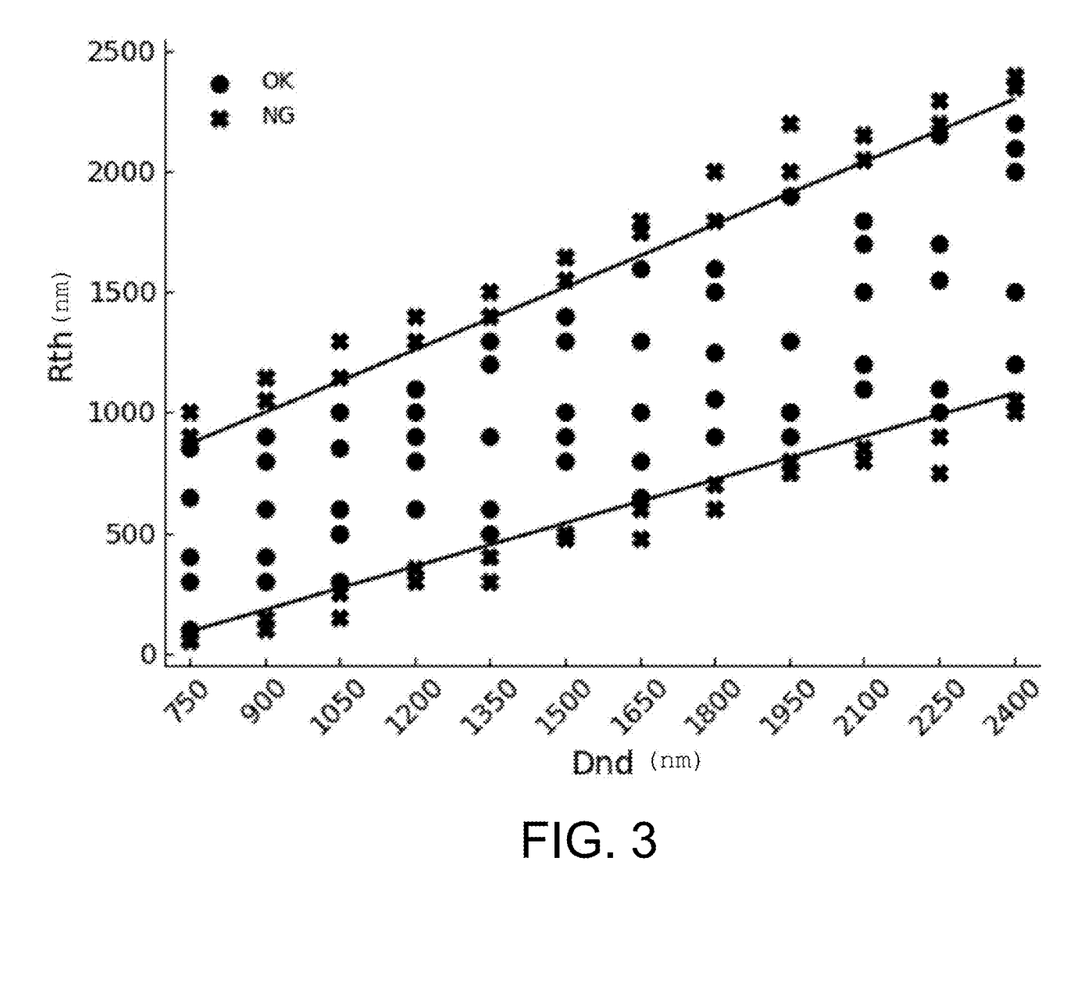
FIG. 3 represents a diagram of the determination distribution of a plurality of viewing angle control structures under the phase retardation values $\Delta nd$ of different adjustable dielectric layers with the overall thickness direction retardation values Rth of different phase adjustment structures.

FIG. 3 represents a diagram of the determination distribution of a plurality of viewing angle control structures under the phase retardation values $\Delta nd$ of different adjustable dielectric layers with the overall thickness direction retardation values Rth of different phase adjustment structures. In FIG. 3, a plurality of labels (such as dots or crosses) represent the determination status of the luminance viewing angle distribution diagrams under different examples, respectively. FIG. 3 illustrates an example of a plurality of viewing angle control structures with different phase retardation values Δnd of the adjustable dielectric layer with different overall thickness direction retardation values Rth of the phase adjustment structure. The phase retardation values Δnd of the adjustable dielectric layers are designed in the range of 750 nm to 2400 nm, for example, and the overall thickness direction retardation values Rth of the phase adjustment structures are designed in the range of 0 nm to 2500 nm, for example. In FIG. 3, the determination status of each example is labeled according to the results of the luminance viewing angle distribution diagrams of different examples. When the luminance viewing angle distribution diagrams are determined to be qualified, the examples are marked with dots, and when the luminance viewing angle distribution diagrams are determined to be unqualified, the examples are marked with crosses. For example, a qualified luminance viewing angle distribution diagram, for example, presents a luminance distribution result similar to that of Example E2 in FIG. 2, and an unqualified luminance viewing angle distribution diagram, for example, presents a luminance distribution result similar to that of Example E1 (or Example E3) in FIG. 2, but the disclosure is not limited thereto.

According to the distribution of dots and crosses in FIG. 3, it may be seen that, an example of the phase retardation value Δnd of the adjustable dielectric layer and the overall thickness direction retardation value Rth of the phase adjustment structure under a certain relationship may achieve the satisfactory switching effect of the wide viewing angle mode or the narrow viewing angle mode. Two boundary lines LA and LB may be substantially defined from the distribution of data points of FIG. 3. The boundary line LA substantially conforms to the equation: B=A*0.8667+220, and the boundary line LB substantially conforms to the equation: B=A*0.600−360, wherein the phase retardation value Δnd of the adjustable dielectric layer is A nm (nanometers), and the overall thickness direction retardation value Rth of the phase adjustment structure is B nm. The conditions of the examples of the switching effect of the wide viewing angle mode or the narrow viewing angle mode that are in conformity generally fall between the boundary line LA and the boundary line L. Therefore, in the viewing angle control structure of an embodiment of the disclosure, A and B may, for example, satisfy the following relationship: A*0.600−360≤B≤A*0.8667+220, but the disclosure is not limited thereto. This equation may be applied to Embodiment 1 to Embodiment 4 of FIG. 1 and the above table, or other suitable embodiments.

In some embodiments, the phase retardation value Δnd of the adjustable dielectric layer may be, for example, between 750 nm and 2400 nm (750 nm≤Δnd≤2400 nm), but the disclosure is not limited thereto. In some embodiments, the phase retardation value Δnd of the adjustable dielectric layer may be configured between 900 nm and 2400 nm (900 nm≤Δnd≤2400 nm). In some embodiments, the phase retardation value Δnd of the adjustable dielectric layer may be configured between 1000 nm and 2400 nm (1000 nm≤Δnd≤2400 nm). In some embodiments, the phase retardation value Δnd of the adjustable dielectric layer may be configured between 1250 nm and 2400 nm (1250 nm≤Δnd≤2400 nm).

Figure 4:
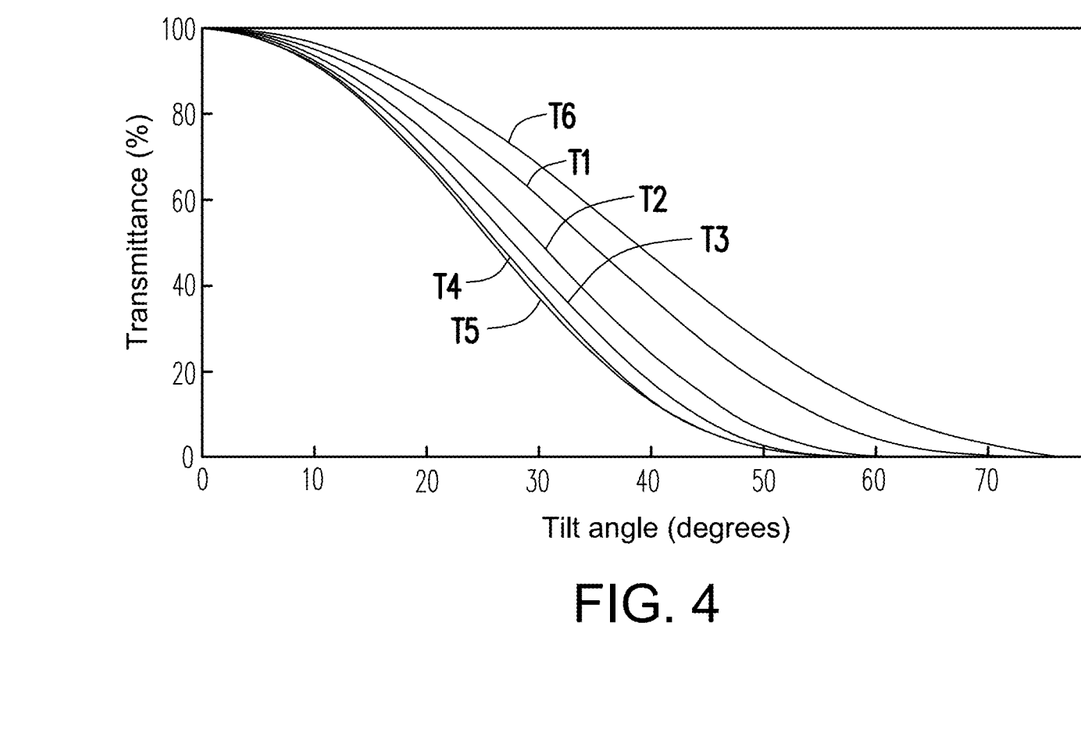
FIG. 4 presents a plot of transmittance (%) versus tilt angle (θ) for examples of different adjustable dielectric layers when driven in a narrow viewing angle mode.

FIG. 4 presents a plot of transmittance (%) versus tilt angle (θ) for examples of different adjustable dielectric layers when driven in the narrow viewing angle mode. The curve in FIG. 4 is, for example, taken from an optical analysis result graph, which may be obtained from the results of measuring via a conoscope lens, but the disclosure is not limited thereto. The curve of the example of FIG. 4 is, for example, the relationship between transmittance (%) and tilt angle (θ) when the azimuth angle (φ) is 0 degrees as taken from the optical analysis result graph when switching different adjustable dielectric layers under the narrow viewing angle mode M1. The examples of these different adjustable dielectric layers are all designed with the composite alignment described in FIG. 1, but different examples may have different phase retardation values Δnd of the adjustable dielectric layers. In FIG. 4, curve T6, for example, presents an example in which the adjustable dielectric layer has a phase retardation value Δnd of 750 nm, curve T1, for example, presents an example in which the adjustable dielectric layer has a phase retardation value Δnd of 900 nm, curve T2, for example, presents an example in which the adjustable dielectric layer has a phase retardation value Δnd of 1200 nm, curve T3, for example, presents an example in which the adjustable dielectric layer has a phase retardation value Δnd of 1500 nm, curve T4, for example, presents an example in which the adjustable dielectric layer has a phase retardation value Δnd of 1800 nm, and curve T5, for example, presents an example in which the adjustable dielectric layer has a phase retardation value Δnd of 2100 nm, wherein curve T4 and curve T5 exhibit a very close curve trend. FIG. 4 shows that when the phase retardation value Δnd of the adjustable dielectric layer is larger, the rate of decrease of the transmittance at the smaller tilt angle (θ) is faster. Therefore, the designer may determine a suitable phase retardation value Δnd of the adjustable dielectric layer according to the desired display effect.

Generally speaking, the smaller the tilt angle (θ) corresponding to the minimum transmittance (for example, when the tilt angle (θ) is equal to or less than 50 degrees), the more the privacy protection requirements of the narrow viewing angle mode M1 may be met. The designer may determine a suitable phase retardation value Δnd of the adjustable dielectric layer according to the desired display effect.

Figure 5:
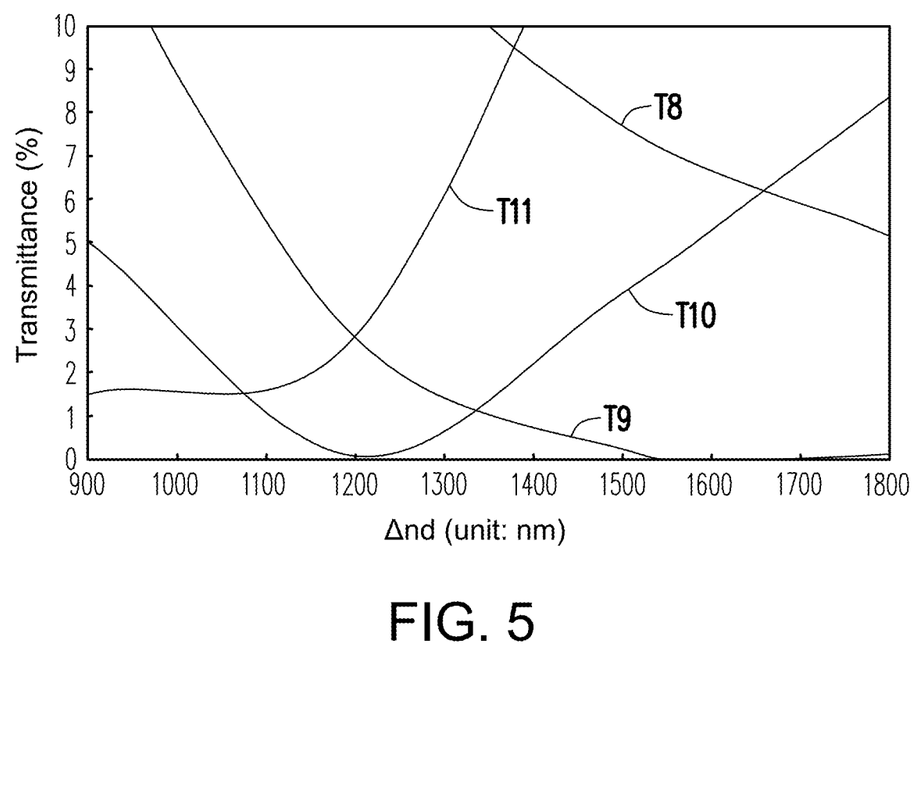
FIG. 5 is a graph of the relationship between transmittance T % and phase retardation value $\Delta nd$ under the alignment conditions of a plurality of adjustable dielectric layers with different alignment pretilt angles.

FIG. 5 is a graph showing the relationship between transmittance T % and phase retardation value Δnd under the alignment conditions of a plurality of adjustable dielectric layers with different alignment pretilt angles. FIG. 5 is, for example, the optical analysis results obtained by driving the examples in a narrow viewing angle mode, wherein FIG. 5 shows the relationship curve between transmittance T % and phase retardation value Δnd when the tilt angle (θ) is about 45 degrees and the azimuth angle (φ) is about 0 degrees in the optical analysis results. The optical analysis results may be obtained from the results of measuring via a conoscopic lens, but the disclosure is not limited thereto. The examples of the plurality of adjustable dielectric layers of FIG. 5 are the composite alignment described in FIG. 1, wherein the pretilt angle of one side of the horizontal alignment of the different examples is fixed, but the side of the vertical alignment has different pretilt angles. For example, curve T8 presents an example in which the adjustable dielectric layer has a pretilt angle of substantially 90 degrees on the side of vertical alignment, curve T9 presents an example in which the adjustable dielectric layer has a pretilt angle of substantially 80 degrees on the side of vertical alignment, curve T10 presents an example in which the adjustable dielectric layer has a pretilt angle of substantially 70 degrees on the side of vertical alignment, and curve T11 presents an example in which the adjustable dielectric layer has a pretilt angle of substantially 60 degrees on the side of vertical alignment. For example, it may be known from curve T10 that, under the condition that the pretilt angle of the adjustable dielectric layer on the vertical alignment side is substantially 70 degrees, when the phase retardation value Δnd of the adjustable dielectric layer is about 1258 nm, the transmittance has a minimum value at a tilt angle (θ) of 45 degrees. Moreover, it may be known from curve T9 that, under the condition that the pretilt angle of the side the adjustable dielectric layer in the vertical alignment is substantially 80 degrees, when the phase retardation value Δnd of the adjustable dielectric layer is about 1600 nm, the transmittance has a minimum value at a tilt angle (θ) of 45 degrees. In addition, under the conditions of the curve T8 and the curve T11, the transmittance at a tilt angle (θ) of 45 degrees does not reach the ideal minimum transmittance. As may be seen from FIG. 5, the designer may decide the design of the phase retardation value Δnd and the pretilt angle of the adjustable dielectric layer according to the desired display effect.

Overall, the designer may set the viewing angle control structure as follows according to the results presented in FIG. 3: when the phase retardation value Δnd of the adjustable dielectric layer is A nm (nanometers), and the overall thickness direction retardation value Rth of the phase adjustment structure is B nm, A and B conform to the following relationship: $A*0.600-360 \leq B \leq A*0.8667+220$. In addition, the designer may further determine the desired phase retardation value Δnd of the adjustable dielectric layer or the alignment pretilt angle of the adjustable dielectric layer according to the relationship shown in FIG. 4 or FIG. 5. In this way, the viewing angle control structure may provide ideal effects in different display modes.

Figure 6:
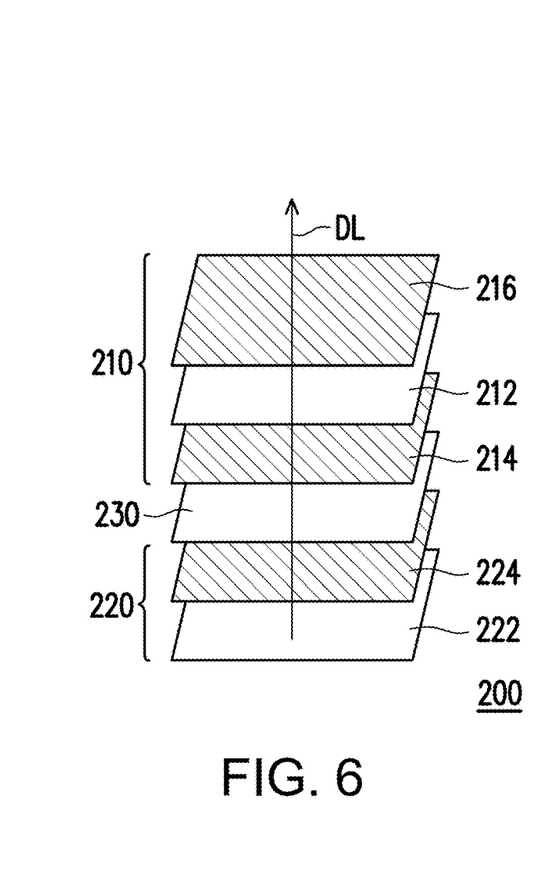
FIG. 6 is a schematic diagram of an electronic device of an embodiment of the disclosure.

FIG. 6 to FIG. 8 below show different embodiments of the electronic device. In FIG. 6 to FIG. 8, in order to clearly show the relative arrangement relationship of the individual members, each member is represented by an oblique rectangular pattern, and the specific structure of each member is omitted. The specific structure of each member may be implemented by the understanding and definition of individual technical terms in the art. FIG. 6 is a schematic diagram of an electronic device of an embodiment of the disclosure. An electronic device 200 of FIG. 6 includes a viewing angle control structure 210, a display structure 220, and an intermediate structure 230 located between the viewing angle control structure 210 and the display structure 220, but the disclosure is not limited thereto. The viewing angle control structure 210 may include, for example, a panel unit 212, a first polarizer 214, and a second polarizer 216, the viewing angle control structure 210 may be implemented as in Embodiment 1 to Embodiment 4 in the preceding table or similar variations, and the viewing angle control structure 210 may have a cross-sectional structure similar or identical to that of FIG. 1. The viewing angle control structure 210 may switch between different modes via driving control, such as switching between a wide viewing angle mode and a narrow viewing angle mode. The optical effects presented by the viewing angle control structure 210 in different modes are as provided in the descriptions of FIG. 2 to FIG. 5.

In some embodiments, the display structure 220 may include a display panel 222 and a third polarizer 224, and the display panel 222 may include a self-luminous display panel, such as an organic light-emitting display panel, a micro light-emitting diode panel, a sub-millimeter light-emitting diode panel, etc., but the disclosure is not limited thereto. In some embodiments, the intermediate structure 230 may be disposed between the viewing angle control structure 210 and the display structure 220. In some embodiments, the intermediate structure 230 may have light transmittance. In some embodiments, the intermediate structure 230 may include an adhesive layer (e.g., optical adhesive or other suitable adhesive layer) to attach the viewing angle control structure 210 and the display structure 220 to each other. In some embodiments, the intermediate structure 230 may be an air layer allowing light to pass through. In some embodiments, a wave plate (not shown) may be further disposed between the display panel 222 and the third polarizer 224.

In some embodiments, the absorption axis of the first polarizer 214 and the absorption axis of the second polarizer 216 may be substantially parallel, but the disclosure is not limited thereto. In some embodiments, the absorption axis of the third polarizer 224 located between the display panel 222 and the viewing angle control structure 210 is, for example, substantially parallel to the absorption axis of the first polarizer 214. When the absorption axis of the first polarizer 214 is substantially parallel to the absorption axis of the third polarizer 224, the light DL emitted by the display panel 222 may have a first polarization direction after passing through the third polarizer 224, and most of the light DL may enter the panel unit 212 via the first polarizer 214. When the light DL enters the panel unit 212 and/or the phase adjustment structure, the polarization state of the light DL may be changed according to the optical effects of the two, so as to adjust the transmittance of a light SL after the light SL passes through the second polarizer 216 of the viewing angle control structure. Thereby, the switching between the wide viewing angle mode and the narrow viewing angle mode is controlled.

In some embodiments, the first polarizer 214 and the third polarizer 224 may be integrated into the same polarizer as needed. At this time, the intermediate structure 230 may be omitted, for example, so that the electronic device 200 may have two polarizers, thereby reducing the thickness and cost of the electronic device 200.

FIG. 7 is a schematic diagram of an electronic device of an embodiment of the disclosure. An electronic device 300 of FIG. 7 includes the viewing angle control structure 210, a display structure 320, an intermediate structure 230, and/or a light source module 328. The viewing angle control structure 210 is as provided in the related description in FIG. 6 and includes the panel unit 212, the first polarizer 214, and the second polarizer 216, but the disclosure is not limited thereto. The display structure 320 may include a display panel 322, a third polarizer 324, and/or a fourth polarizer 326. The display panel 322 may be a non-self-luminous panel, such as a liquid-crystal display panel, but the disclosure is not limited thereto. The light source module 328 may be disposed under the display structure 320 and/or the viewing angle control structure 210, and the light source module 328 may be used to provide the light DL to the display structure 320. In some embodiments, the third polarizer 324 and the fourth polarizer 326 may be located at two opposite sides of the display panel 322, and the third polarizer 324 may be located between the display panel 322 and the panel unit 212 (or the light source module 328), but the disclosure is not limited thereto. In some embodiments, the viewing angle control structure 210 may be disposed between the light source module 328 and the display structure 320, but the disclosure is not limited thereto. In other embodiments, the display structure 320 may be disposed between the light source module 328 and the viewing angle control structure 210.

In the present embodiment, the viewing angle control structure 210 may provide different display modes via driving control as in the previous embodiments. Therefore, the electronic device 300 may provide a narrow viewing angle display effect and a wide viewing angle display effect, so as to switch between different modes according to different usage scenarios. In other embodiments, the absorption axis of the second polarizer 216 of the viewing angle control structure 210 and the absorption axis of the third polarizer 324 of the display structure 320 may be substantially parallel. Therefore, the second polarizer 216 and the third polarizer 324 may be optionally integrated into a single polarizer, thereby reducing the thickness and cost of the electronic device 300.

FIG. 8 is a schematic diagram of an electronic device of an embodiment of the disclosure. An electronic device 400 of FIG. 8 is substantially similar to the electronic device 300 of FIG. 7, and both have the same components. The electronic device 400 of FIG. 8 includes the viewing angle control structure 210, the display structure 320, and the intermediate structure 230. Specifically, the display structure 320 may include the display panel 322, the third polarizer 324, and the fourth polarizer 326, and the display structure 320 is located between the light source module 320 and the viewing angle control structure 210. The viewing angle control structure 210 may provide the electronic device 400 with display modes having different viewing angle ranges (e.g., the wide viewing angle mode and the narrow viewing angle mode), and for the specific structure and the properties of each member of the viewing angle control structure 210, reference may be made to the descriptions of the above embodiments. In other embodiments (not shown), the electronic device 400 may include two viewing angle control structures 210, and the two viewing angle control structures 210 may be located at two sides of the display structure 320 (or the display panel 322), respectively. In some embodiments, the polarizer adjacent to the light source module 328 may, for example, be integrated into the existing optical film of the light source module 328 to simplify the members of the overall device.

Figure 9A:
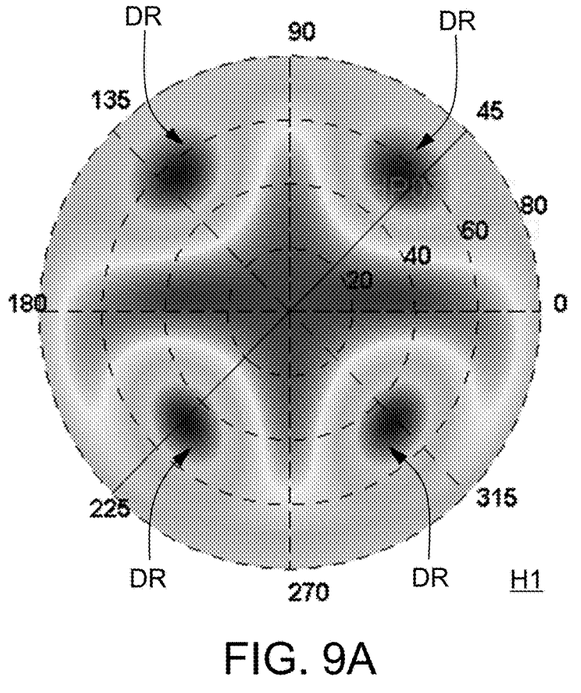
FIG. 9A to FIG. 9C show luminance distribution diagrams when the adjustable dielectric layer is in a composite alignment with different phase retardation values $\Delta nd$.
Figure 9B:
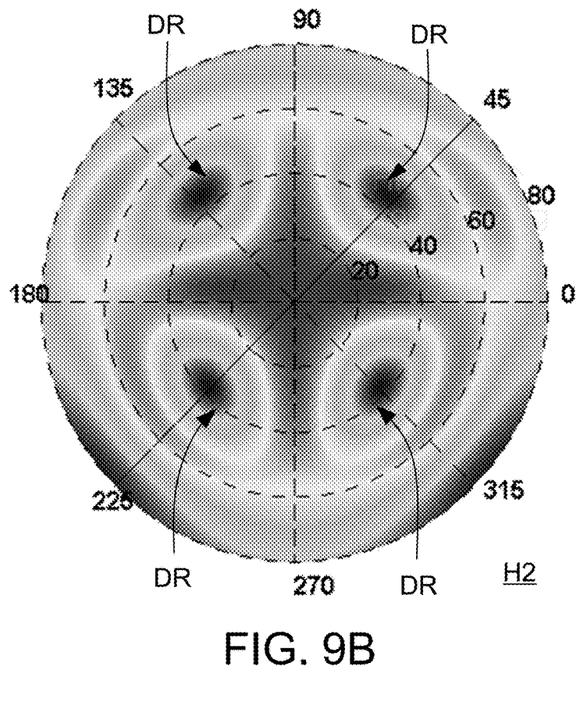
Figure 9C:
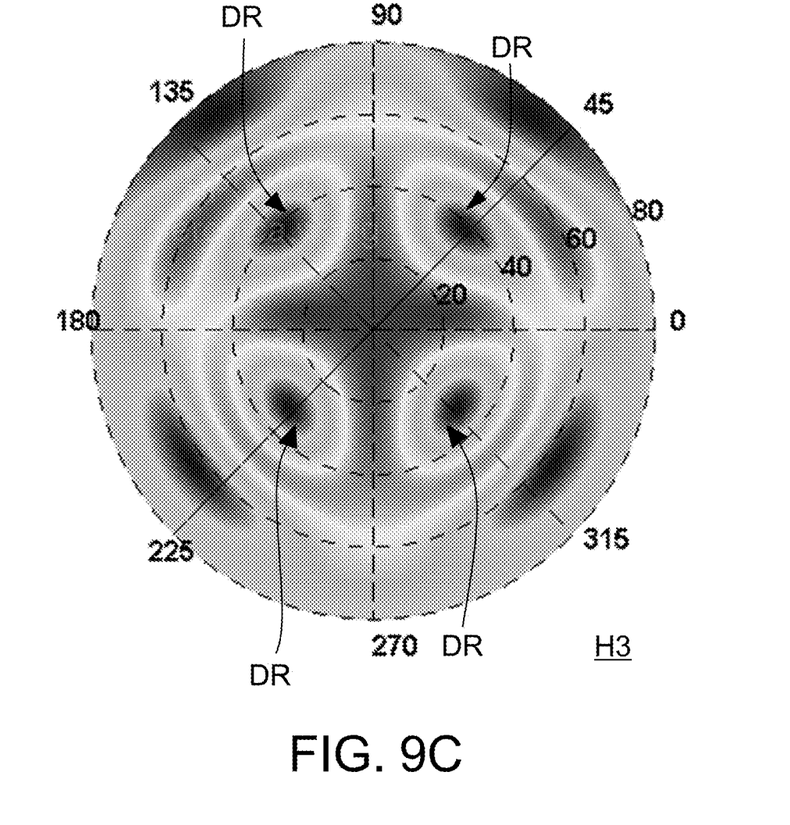

In some embodiments, optical parameters of the viewing angle control structure (such as the thickness direction retardation value (Rth) of the phase retardation structure, the phase retardation value $\Delta nd$ of the adjustable dielectric layer, the pretilt angle of the alignment, etc.) in the above embodiments may be measured using equipment such as an Abbe refractometer, a polarimeter (Axostep), or a spectrophotometer, but the disclosure is not limited thereto, and such optical parameters may also be measured using other suitable equipment or methods. In addition, the composite alignment of the adjustable dielectric layer may be determined by using the luminance distribution diagram presented by the adjustable dielectric layer, but the disclosure is not limited thereto. For example, FIG. 9A to FIG. 9C respectively show luminance distribution diagrams when the adjustable dielectric layer is in the composite alignment with different phase retardation values $\Delta nd$. The luminance distribution diagrams of FIG. 9A to FIG. 9C may be obtained from the results of measuring with a conoscopic lens, but the disclosure is not limited thereto. It should be mentioned that, FIG. 9A to FIG. 9C are, for example, optical results of the adjustable dielectric layer disposed between two polarizers with absorption axis directions parallel to each other, and the viewing angle control structure does not have any phase retardation structure, and FIG. 9A to FIG. 9C are, for example, optical results of switching the viewing angle control structure to the wide viewing angle mode. A distribution diagram H1, a distribution diagram H2, and a distribution diagram H3 shown in FIG. 9A to FIG. 9C respectively show the luminance distribution under the condition that the phase retardation values $\Delta nd$ of the adjustable dielectric layers are 1200 nm, 1800 nm, and 2400 nm. The three distribution diagrams H1 to H3 have significant dark areas DR at azimuth angles of about 45 degrees, 135 degrees, 225 degrees, and 315 degrees. Therefore, when detecting the viewing angle control structure, whether the adjustable dielectric layer is in the composite alignment may be proved by the results of the dark areas DR at the azimuth angles of 45 degrees, 135 degrees, 225 degrees, and 315 degrees in the luminance distribution diagrams. That is, the alignment layer of one side is in the vertical alignment, and the alignment layer on the other side is in horizontal alignment. In addition, the composite alignment of the adjustable dielectric layer may also be achieved by using alignment layers of different materials. For example, one of the alignment layers on both sides of the adjustable dielectric layer may be made of a commonly known vertical alignment layer material, and the other layer may be made of a commonly known horizontal alignment layer material. Therefore, when the alignment layers on both sides of the control dielectric layer have different materials, they may be used to prove that the control dielectric layer is in the composite alignment.

Moreover, another method to prove whether the adjustable dielectric layer is in the composite alignment is by obtaining two identical viewing angle control structures 210, separating the first substrate (on which the first alignment layer is provided) and the second substrate (on which the second alignment layer is provided), respectively, and subsequently, any liquid-crystal material may be used and disposed between the first substrates of the two viewing angle control structures 210. Alternatively, any liquid-crystal material is selected and disposed between the second substrates of the two viewing angle control structures 210, and whether the adjustable dielectric layer is in the composite alignment is determined by observing the optical changes thereof.

Based on the above, the electronic device of an embodiment of the disclosure has the viewing angle control structure, and the viewing angle control structure includes the adjustable dielectric layer and the phase adjustment structure. The adjustable dielectric layer and the phase adjustment structure are matched with each other to provide control and adjustment of the viewing angle range. Therefore, the electronic device may have a plurality of display modes (e.g., the wide viewing angle mode and the narrow viewing angle mode). In an embodiment of the disclosure, the adjustable dielectric layer is subjected to the composite alignment and satisfies the thickness direction retardation value of the suitable phase adjustment structure, and the viewing angle control structure may substantially have no undesired bright areas at the oblique viewing angle in the narrow viewing angle mode, and may substantially have no undesired dark areas at the oblique viewing angle in the wide viewing angle mode. In other words, the electronic device may provide a good display effect in both modes. In some embodiments, the existing substrate of the viewing angle control structure may provide the function of the phase adjustment structure without the need for an additional phase adjustment structure. In other embodiments, the viewing angle control structure may have an additional phase adjustment structure to provide the desired thickness direction retardation value.

Lastly, it should be noted that the above embodiments are used to describe the technical solution of the disclosure instead of limiting it. Although the disclosure has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the disclosure.

What is claimed is:

1. An electronic device, comprising:
    a viewing angle control structure, comprising:
        a first substrate;
        a second substrate disposed opposite to the first substrate;
        an adjustable dielectric layer disposed between the first substrate and the second substrate;
        a first alignment layer disposed between the first substrate and the adjustable dielectric layer;
        a second alignment layer disposed between the second substrate and the adjustable dielectric layer;
        a first polarizer disposed on a side of the first substrate away from the adjustable dielectric layer;
        a second polarizer disposed on a side of the second substrate away from the adjustable dielectric layer; and
        a phase adjustment structure disposed between the second alignment layer and the second substrate;
    wherein one of the first alignment layer and the second alignment layer is in a horizontal alignment and the other of the first alignment layer and the second alignment layer is in a vertical alignment.

2. The electronic device of claim 1, wherein an alignment tilt angle of the horizontal alignment is between 0 degrees and 30 degrees, and an alignment tilt angle of the vertical alignment is between 50 degrees and 90 degrees.

3. The electronic device of claim 1, wherein the phase retardation value And of the adjustable dielectric layer is between 750 nm and 2400 nm.

4. The electronic device of claim 1, wherein the phase adjustment structure comprises a multilayer structure.

5. The electronic device of claim 1, wherein an absorption axis direction of the first polarizer is substantially parallel to an absorption axis direction of the second polarizer.

6. The electronic device of claim 1, wherein a material of the adjustable dielectric layer comprises liquid crystal.

7. The electronic device of claim 1, further comprising a display structure and an intermediate structure, wherein the intermediate structure is located between the viewing angle control structure and the display structure.

8. The electronic device of claim 7, wherein the intermediate structure comprises an adhesive layer or an air layer.

9. The electronic device of claim 7, wherein the display structure comprises a display panel and a third polarizer, and the third polarizer is located between the display panel and the viewing angle control structure.

10. An electronic device, comprising:
    a viewing angle control structure, comprising:
        a first substrate;
        a second substrate disposed opposite to the first substrate;
        an adjustable dielectric layer disposed between the first substrate and the second substrate;
        a first polarizer disposed on a side of the first substrate away from the adjustable dielectric layer;
        a second polarizer disposed on a side of the second substrate away from the adjustable dielectric layer;
        an alignment layer disposed between the second substrate and the adjustable dielectric layer; and
        a phase adjustment structure disposed between the alignment layer and the second substrate;
    wherein a phase retardation value And of the adjustable dielectric layer is A nm, an overall thickness direction retardation value Rth of the phase adjustment structure is B nm, and A and B conform to the following relationship:
    $A*0.600-360 \leq B \leq A*0.8667+220$.

11. The electronic device of claim 10, wherein the phase retardation value And of the adjustable dielectric layer is between 750 nm and 2400 nm.

12. The electronic device of claim 10, wherein the phase adjustment structure comprises a multilayer structure.

13. The electronic device of claim 10, wherein
    the first substrate disposed between the first polarizer and the adjustable dielectric layer.

14. The electronic device of claim 13, wherein the viewing angle control structure further comprises another alignment layer disposed between the first substrate and the adjustable dielectric layer.

15. The electronic device of claim 10, wherein an absorption axis direction of the first polarizer is substantially parallel to an absorption axis direction of the second polarizer.

16. The electronic device of claim 10, further comprising a display structure and an intermediate structure, wherein the intermediate structure is located between the viewing angle control structure and the display structure.

17. The electronic device of claim 16, wherein the intermediate structure comprises an adhesive layer or an air layer.

18. The electronic device of claim 16, wherein the display structure comprises a display panel and a third polarizer, and the third polarizer is located between the display panel and the viewing angle control structure.

* * * * *